United States Patent [19]

Bloomer

[11] 4,397,662
[45] Aug. 9, 1983

[54] APPARATUS FOR REMOVING SOLVENTS FROM AIR

[75] Inventor: Ivan Bloomer, London, England

[73] Assignee: Schweitzer Industrial Corporation, Madison Heights, Mich.

[21] Appl. No.: 287,346

[22] Filed: Jul. 27, 1981

[30] Foreign Application Priority Data

Jul. 30, 1980 [GB] United Kingdom ............... 8024975

[51] Int. Cl.³ .......................................... B01D 47/00
[52] U.S. Cl. ..................................... 55/228; 55/233; 55/259; 261/98; 261/116; 261/106; 98/115 SB
[58] Field of Search ....................... 55/85, 89, 90, 228, 55/93, 94, 233, 259; 98/115 SB; 261/98, 116, 21, 106

[56] References Cited

U.S. PATENT DOCUMENTS

| | | | |
|---|---|---|---|
| 2,513,174 | 6/1950 | Hess | 55/90 |
| 3,760,566 | 9/1973 | Zievers et al. | 261/98 |
| 3,957,464 | 5/1976 | Teller | 55/85 |
| 4,036,593 | 7/1977 | Satoh | 261/116 |
| 4,039,307 | 8/1977 | Bondor | 261/121 |
| 4,102,982 | 7/1978 | Weir, Jr. | 55/73 |
| 4,175,933 | 11/1979 | James | 55/259 |
| 4,261,707 | 4/1981 | Bradshaw et al. | 55/85 |

FOREIGN PATENT DOCUMENTS

| | | | |
|---|---|---|---|
| 1019794 | 11/1957 | Fed. Rep. of Germany | 55/94 |
| 2320735 | 11/1957 | Fed. Rep. of Germany | 55/233 |
| 51-48767 | 4/1976 | Japan | 55/93 |
| 1199021 | 7/1970 | United Kingdom | 55/233 |

*Primary Examiner*—Bernard Nozick
*Attorney, Agent, or Firm*—Krass, Young & Schivley

[57] ABSTRACT

Apparatus for removing solvents from air, for example, from the air discharged from a paint spraybooth, includes an air duct through which solvent laden air is arranged to flow. A plurality of coalescer pads each having an extended surface area extend across the duct. A plurality of spray nozzles for spraying an absorption liquid such as oil are arranged upstream of each pad and have a spray pattern which impinges over substantially all of the upstream external surface of the respective pad. As the pressure drop experienced by the air flowing through the pads is low the apparatus enables efficient solvent removal and yet has a lower power requirement.

14 Claims, 3 Drawing Figures

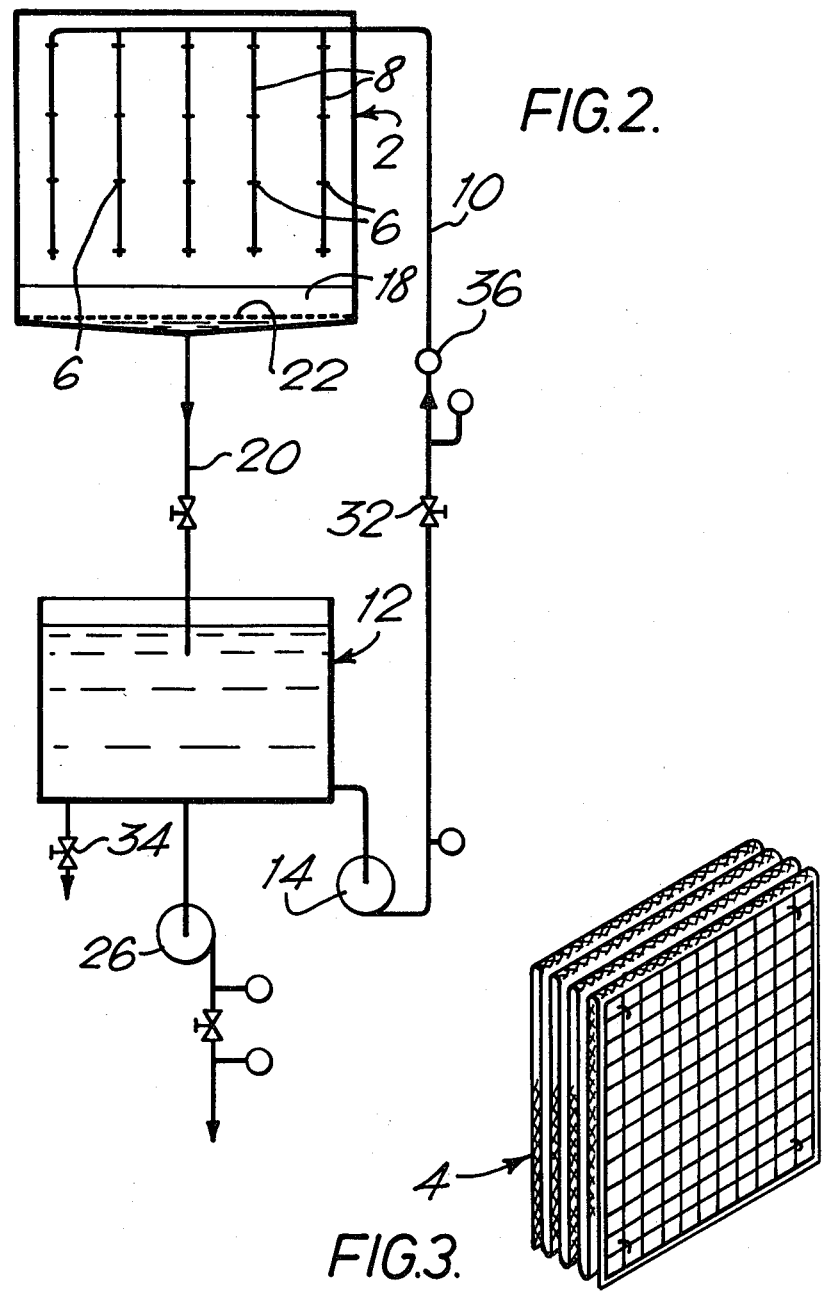

APPARATUS FOR REMOVING SOLVENTS FROM AIR

BACKGROUND OF THE INVENTION

The present invention relates to apparatus for removing solvents from air.

When painting operations are carried out in spraybooths solvents are released into the air. It is necessary to remove the solvents from the air before the air is discharged to the atmosphere.

It is known to remove solvent vapour from air by passing the air through activated carbon beds. However, such carbon beds have a considerable resistance to the passage of air such that power is required to drive the air through the beds. It is also known to pass the solvent laden air through a mist of atomised absorption liquid which has an effinity for the solvent. Generally the absorption liquid is an oil, and considerable energy is required in order to atomize the oil sufficiently.

It is an object of the present invention to provide apparatus for removing solvent vapour from air which is effective and also has a low power requirement.

SUMMARY OF THE INVENTION

According to the present invention there is provided apparatus for removing solvents from air comprising a passage through which solvent laden air is arranged to flow, a member arranged within said passage, said member having two external surfaces spaced from one another in the direction of air flow and extending across said passage and an extended surface area, and at least one spray nozzle for an absorption liquid arranged upstream of said member in the direction of air flow, the spray nozzle or nozzles being arranged to have a spray pattern which impinges over substantially all of the upstream external surface of said member.

In an embodiment said member is a coalescer pad formed from a folded sheet of mesh. The mesh may be made of metal wires, for example, of stainless steel, or may be made of a plastics material such as nylon or polypropylene. The dimension of the pad in the direction of the air flow is preferably between 1 inch and 6 inches.

Preferably a plurality of spray nozzles are provided and are uniformly spaced to form a matrix arranged in a plane substantially parallel to the upstream external surface of the member. In general, the external surfaces of said member extend transversely of said passage.

In an embodiment, a plurality of said members are spaced along said passage and each has an associated matrix of spray nozzles arranged upstream thereof. A sump for the collection of the absorption liquid together with the solvent is associated with each member. A tank for the absorption liquid is provided and a respective input pipe communicates each matrix of nozzles with the tank.

Preferably, the tank is divided into a number of sections by way of adjustable wiers, each section containing the absorption liquid to be fed by the respective input pipe to an associated matrix of spray nozzles and hence to the associated member. Each sump is communicated with that section of the tank associated with the respective member. The wiers are arranged to allow flow of the absorption liquid through the tank in the direction from the section associated with the most downstream of the members to the section associated with the most upstream of the members. Means may also be provided for continuously or intermittently supplying absorption liquid to the downstream section of the tank and for continuously or intermittently removing absorption liquid from the upstream section of the tank. The liquid removed from the tank may be fed by way of a regeneration system back to the downstream section of the tank.

BRIEF DESCRIPTION OF THE DRAWINGS

An embodiment of the present invention will hereinafter be described, by way of example, with reference to the accompanying drawings, in which:

FIG. 2 shows a section of the apparatus taken along the line A—A of FIG. 1, and FIG. 3 shows a perspective view of a coalescer pad of the apparatus of FIGS. 1 and 2.

FIGS. 1 and 2 show apparatus for removing solvent from the air discharged from a paint spraybooth which is laden with solvent. The apparatus comprises an air duct 2 through which the solvent laden air is arranged to flow in the direction of arrow B. A plurality of coalescer pads 4 are arranged within the duct 2 and are spaced apart in the direction of the air flow. Each pad 4 extends across the duct 2 such that the air must flow through the pads 4.

Figure 1:
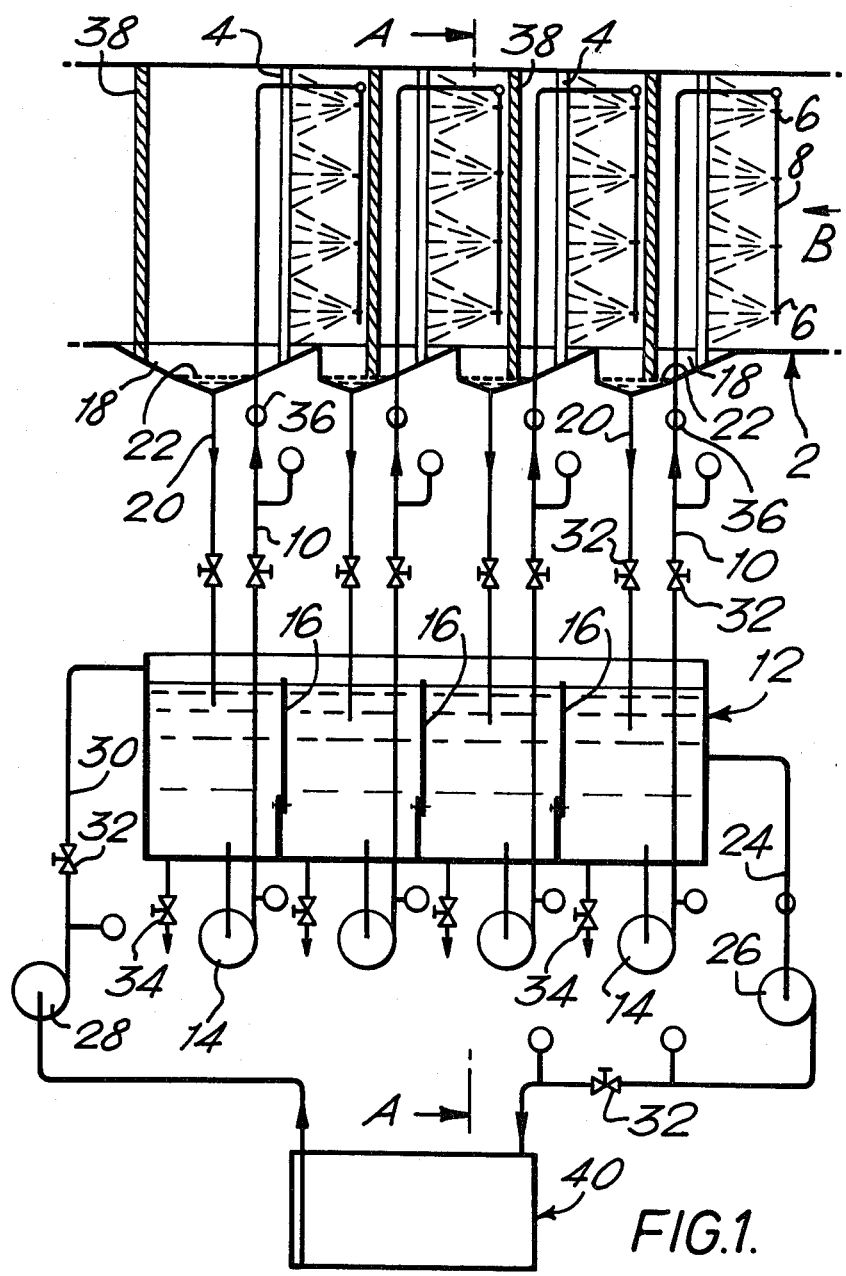
FIG. 1 shows schematically apparatus for removing solvent from solvent laden air.

Upstream of each pad 4 in the direction of air flow are arranged a plurality of spray nozzles 6. The spray nozzles 6 associated with each pad 4 are spaced along a number of oil supply pipes 8 which extend substantially parallel to each other perpendicular to the longitudinal and transverse axes of the duct 2. The oil supply pipes 8 are spaced transversely such that the spray nozzles 6 are arranged in a substantially uniformly spaced matrix within a transverse plane of the duct 2. The matrix of spray nozzles 6 is suitably spaced from the upstream transverse surface of the associated pad 4 such that the spray pattern effectively covers the whole of this upstream transverse surface of the pad 4.

The oil supply pipes 8 associated with each pad 4 are connected to a common supply pipe 10 which is connected to a tank 12 by way of a respective pump 14. The tank 12, which contains oil having an affinity for the solvent to be removed from the air, is divided into a number of sections by way of adjustable wiers 16. Each section of the tank 12 is associated with a respective pump 14 and common supply pipe 10.

The duct 2 is provided with a plurality of oil sumps 18 each arranged beneath a respective pad 4 and extending downstream of the pad. Each oil sump 18 has a drain connected to an outlet pipe 20 which drains into the associated section of the tank 12. A coarse mesh filter 22 extends across the drain of each oil sump 18.

The tank 12 has an output pipe 24 at its output end connected by way of a pump 26 to an oil regenerator system indicated at 40. The regenerator system is also connected by way of a pump 28 to an input pipe 30 at the input end of the tank 12. The regenerator system 40 may comprise any suitable means for cleaning the oil, for example, the regenerator system may be a distillation column.

It will be appreciated that flow control valves, as 32, will be provided in the common supply pipes 10, the outlet pipes 20, the output pipe 24 and the input pipe 30 such that the flow of oil can be controlled as required. In addition, a respective drain valve 34 is associated with each section of the tank 12. Furthermore, one or more oil filters 36 may be provided in each common supply pipe 10.

Downstream of the pads 4, a mist eliminator 38 is arranged across the duct 2. This mist eliminator may be a conventional eliminator, for example, of plastics material, or it may have a structure similar to that of the pads 4. Additional mist eliminators 38 may also be arranged across the duct 2 between the pads 4. In the embodiment illustrated in FIG. 1 a respective mist eliminator 38 is inserted between each pad 4 and the spray nozzles 6 associated with the next following pad 4.

A perspective view of one of the coalescer pads 4 is shown in FIG. 3. The pad is formed from a folded sheet of mesh preferably of open-loop knit. The knit mesh may be made of metal wire, for example, of stainless steel, or may be of a plastics material such as nylon or polypropylene. The upstream and downstream transverse surfaces of the pad are each formed by a sheet of weld mesh stitched to the knit mesh which support the pad within the duct 2. The longitudinal dimension of the pad, that is the distance between the upstream and downstream transverse surfaces, and its density are chosen such that the pressure drop experienced by air flowing through the pad is kept low. It will be appreciated that the pad has an extended internal surface area.

In operation, the tank 12 is filled with oil to a predetermined level and the wiers 16 are suitably adjusted. The pumps 14 are then operated such that oil is supplied to the matrices of spray nozzles 6 and sprayed onto the pads 4. The oil draining from the pads 4 into the sumps 18 is then fed back into the tank 12 by the outlet pipes 20.

The solvent laden air discharged from the spraybooth is fed into the duct 2. It has been found that the usual air discharge fan provided at the air outlet of the spraybooth generally gives the air flow sufficient velocity through the duct 2. As the solvent laden air flows through the pads 4 the solvent therein is absorbed by the oil which forms a film on the extended surface of the pad. The oil and the absorbed solvent then drains into the tank 12 and the air continues through the duct 2 and is discharged to atmosphere.

As the air passes through each pad 4 a substantially constant proportion of the total volume of solvent carried thereby is removed. Of course, the actual volume of solvent removed at each pad progressively decreases as the air continues downstream and the upstream pad 4 removes the largest actual volume of solvent. Accordingly, the oil in the section of the tank 12 associated with the upstream pad 4 becomes quickly loaded with solvent whilst the solvent content of the oil in the adjoining sections is progressively less loaded in the direction of the air flow.

Thus, the oil in the section of the tank 12 associated with the downstream pad 4 remains relatively clean of solvent. The wiers 16 are thus adjusted such that there is a cascaded flow of oil through the sections of the tank 12 from its input end to its output end, that is, in the direction opposite to the direction of the air flow. Furthermore, the oil which is heavily laden with solvent is continuously removed through the output pipe 24 whilst clean oil is continuously fed to the tank 12 through the input pipe 30.

In the embodiment illustrated, the oil flows within a closed system including an oil regenerator system 40 for continuously cleaning the oil. Of course, if it is more convenient the oil removed by way of the output pipe 24 may be fed to a collection tank and clean oil from a reservoir may be fed to the input pipe 30. The oil in the collection tank can then be removed to another site for cleaning and reuse. Furthermore, if required, oil need not be removed from the tank 12 and replaced continuously. In some circumstances it may be sufficient that the oil replacement take place intermittently.

Once the air has passed through each of the pads 4 it flows through the downstream mist eliminator 38 before passing through the next pad 4 on being discharged. Each eliminator 38 traps solvent and oil carried by the air. The eliminators 38 are each arranged within the duct 2 such that oil and/or solvent trapped thereby drains into a respective sump 18.

In the embodiment illustrated, four coalescer pads 4 are provided but it is obvious that any number of pads may be used as appropriate. In addition, the longitudinal dimension of the or each pad may be chosen as required.

As the longitudinal dimension of the pad is increased the solvent removal rate increases. However, this relationship is not linear and the slope of the curve becomes less as the dimension increases. Furthermore, the pressure drop of the air across the pad increases as the longitudinal dimension increases and the slope of this curve also increases as the dimension increases. The pressure drop determines the power required to drive the air through the duct 2. It will be appreciated that the number of pads provided and the longitudinal dimension of each can therefore be determined to give optimum solvent removal with an efficient use of power. Thus, in experiments it has been found that four pads each having a longitudinal dimension of 25.4 mm were as effective at removing solvent as one pad having a longitudinal dimension of 152.4 mm. However, the four pads required less power than the single pad to drive the air through the duct 2, that is, the arrangement using four pads was most efficient.

There are a number of other factors which also affect the effectiveness of the solvent removal in any particular arrangement. These factors include:
 (a) the air velocity through the coalescer pad
 (b) the pressure of the oil applied to the spray nozzles
 (c) the oil flow rate through the spray nozzles
 (d) the coalescer pad thickness
 (e) the structure of the coalescer pad
 (f) the solvent concentration in the oil
 (g) the temperature of the air flowing through the duct.

Obviously, these various factors have to be determined in each instance in dependence upon the structure of the apparatus, the power requirements, the removal rate required, the nature of the oil and the nature of the solvent.

EXAMPLE

This is a suggested example for the apparatus shown in FIGS. 1 and 2 arranged to treat the air discharged from a working spraybooth.
 Area of apparatus: 20 sq.ft.
 Number of coalescer pads: 4
 Longitudinal dimension of each pad: 1 inch
 Air velocity: 1000 ft/min
 Solvent concentration in air: approx. 400 ppm
 Oil pressure: 25 psi
 Oil flow rate/sq.ft./pad: 5.7 gpm
 Oil flow rate/pad: 114 gpm
 Total oil flow rate: 456 gpm
 Quantity of oil in each section of the tank: 150 gallons Rate of removal of oil from tank: 50 gallons/min.

It is predicted that this example will produce an efficiency of 80% solvent removal and that solvent will have to be removed from the oil at the rate of 1 liter of solvent from 50 gallons of oil per minute.

It is suggested that each coalescer pad should have the following construction:

Volume of pad: 12 in × 12 in × 1 in
Weight of pad: 261 g
Wire diameter: 0.01 in (A.I.S.I. 361 wire)
Pad density: 6.93 lb/cu.ft
Surface area of wire in pad: 11.52 sq.ft.

It is preferred that the wire knit sheet be folded to have between 8 and 12 folds per inch.

In the embodiment described above oil has been specified as the absorption liquid. Of course, the absorption liquid is chosen in accordance with the type of solvent to be removed.

The apparatus is illustrated with the air duct 2 disposed horizontally. Of course, the air duct may be arranged at an angle to the horizontal where space requirements make this necessary. Furthermore, the air duct may be disposed vertically. Accordingly, existing duct work systems both upstream and downstream of the fan employed may be utilized.

I claim:

1. Apparatus for removing solvents from air comprising a passage through which solvent laden air is arranged to flow, a plurality of absorption liquid distributor members spaced within and along the passage in the direction of air flow, each said member extending across said passage and having an extended surface area, and a plurality of spray nozzles for an absorption liquid; at least one of said spray nozzles being arranged upstream of each said member in the direction of air flow to spray absorption liquid in the direction of air flow into the respective member such that films of absorption liquid are formed within said members in intimate contact with the air flow whereby the solvent is absorbed by the absorption liquid, sump means formed within the passage and beneath each member for collecting by gravity flow the absorption liquid and solvent solution from each said member, and means connected in liquid flow relation with the sump means for feeding at least a portion of the collected solution from each said member to the spray nozzles.

2. Apparatus according to claim 1 wherein each said distributor member is a coalescer pad formed from a folded sheet of mesh.

3. Apparatus for removing solvents from air comprising a passage through which solvent laden air is arranged to flow, a plurality of absorption liquid distributor members spaced along and within the passage in the direction of air flow, each said member extending across said passage and having an extended surface area, and a plurality of spray nozzles for an absorption liquid; at least one of said spray nozzles being arranged upstream of each said member in the direction of air flow to spray absorption liquid in the direction of air flow into the respective member such that films of absorption liquid are formed within said members in intimate contact with the air flow whereby the solvent is absorbed by the absorption liquid, a multi chambered source container for absorption liquid, liquid conduit means connecting respective chambers of said source to supply respective spray nozzles, sump means in said passage and beneath each member for collecting absorption liquid and solvent solution by gravity flow from respective ones of said members and returning said solution to respective chambers of said source, wier means within the source container for causing a progressive flow of absorption liquid between the chambers of said source container, the direction of flow being such that absorption liquid from the most downstream of said nozzles in said passage flows toward absorption liquid from the most upstream of said nozzles in the direction of air flow.

4. Apparatus as defined in claim 3 further including means or further including absorption liquid regenerator means, means for causing a flow of absorption liquid and solvent solution from the source chamber associated with the most upstream of said nozzles and means for returning regenerated absorption liquid to the chamber associated with the most downstream of said nozzles.

5. Apparatus for removing solvents from air comprising a passage through which solvent laden air is arranged to flow, a plurality of absorption liquid distributor members spaced within and along the passage in the direction of air flow, each said member extending across said passage and having an extended surface area, and a plurality of spray nozzles for an absorption liquid; at least one of said spray nozzles being arranged upstream of each said member in the direction of air flow to spray absorption liquid in the direction of air flow into the respective member such that films of absorption liquid are formed within said members in intimate contact with the air flow whereby the solvent is absorbed by the absorption liquid, sump means formed within the passage and beneath each member for collecting by gravity flow the absorption liquid and solvent solution from each said member, and means connected in liquid flow relation with the sump means for feeding at least a portion of the collected solution from each said member to the spray nozzles, said means connected in liquid flow relation comprising a tank for containing the collected absorption fluid, a plurality of adjustable wiers within the tank and dividing the tank into a plurality of compartments, a plurality of input pipes equal in number to the number of distributor members, each input pipe connecting a compartment of the tank to a spray nozzle associated with a respective one of said distributor members whereby each compartment of the tank supplies absorption liquid to a spray nozzle associated with a different distributor member, and means connecting each of said sump means to a respective compartment of said tank.

6. Apparatus according to claim 1, wherein the wiers are constructed to promote flow of absorption liquid through the tank in the direction from the section associated with the most downstream one of the members to the section associated with the most upstream one of the members.

7. Apparatus according to claim 6, further comprising means for continuously or intermittently supplying absorption liquid to the downstream section of the tank, and means for continuously or intermittently removing absorption liquid from the upstream section of the tank.

8. Apparatus according to claim 7, further comprising a regeneration system connected to receive absorption liquid from said removing means and to supply regenerated absorption liquid to said supplying means.

9. Apparatus according to claim 5, wherein each said distributor member is a coalescer pad formed from a folded sheet of mesh.

10. Apparatus according to claim 9, wherein the mesh is made of metal or plastics material.

11. Apparatus according to claim 5, wherein each said member has two external surfaces spaced from one another in the direction of air flow, and a respective plurality of said spray nozzles is arranged upstream of each said member and is arranged to have a spray pattern which impinges over substantially all of the upstream external surface of the associated member.

12. Apparatus according to claim 11 wherein the distance between the two external surfaces of each said pad is between 1 inch and 6 inches.

13. Apparatus according to claim 11, wherein the plurality of spray nozzles arranged upstream of each said member are uniformly spaced to form a matrix arranged in a plane substantially parallel to the upstream external surface of the associated member.

14. Apparatus according to claim 13, wherein said two external surfaces of each said member extend substantially transversely of said passage.

* * * * *